UNITED STATES PATENT OFFICE.

HYLEMAN ALISON WEBSTER, OF COLUMBIA, TENNESSEE, ASSIGNOR TO JOHN J. GRAY, JR., OF ROCKDALE, TENNESSEE.

PROCESS OF MAKING FERROPHOSPHORUS.

1,264,236.  Specification of Letters Patent.  Patented Apr. 30, 1918.

No Drawing.  Application filed October 13, 1916.  Serial No. 125,408.

*To all whom it may concern:*

Be it known that I, HYLEMAN ALISON WEBSTER, a citizen of the United States, residing at Columbia, in the county of Maury and State of Tennessee, have invented certain new and useful Improvements in Processes of Making Ferrophosphorus; and I do hereby declare the following to be a full, clear, and exact description of the invention, such as will enable others skilled in the art to which it appertains to make and use the same.

This invention relates to a process of producing ferro-phosphorus from iron phosphates, and has for its object the making of this product with a higher content of phosphorus than is possible in an ordinary blast furnace.

With this and other objects in view, the invention consists in the novel steps and combinations of steps constituting the process, all as will be more fully hereinafter disclosed and particularly pointed out in the claims.

In the U. S. patent issued to John J. Gray, Jr., No. 831427, dated September 18, 1906, and entitled Manufacture of ferrophosphorus, there is disclosed a process of producing ferro-phosphorus of a high phosphorus content from tri-calcium phosphate in a blast furnace. But the product obtained from this process and in other blast furnace processes, does not contain exceeding say 22 to 25% of phosphorus; and in practice, it has been found impossible by any methods heretofore known, to increase this content of phosphorus when employing a blast furnace. I find that one of the reasons why more phosphorus cannot be forced into the iron is due to the limited normal partial pressures of the products of reaction which must obtain in any blast furnace process. In other words, I believe that if the partial pressures of the reaction products could be increased in the patented blast furnace process above mentioned, a greater proportion of phosphorus would enter the iron and the product would thereby contain a higher percentage of phosphorus.

It is a further fact that even when an iron phosphate charge is used in a blast furnace for the production of ferro-phosphorus, all of the chemically combined phosphorus is not retained in the reduced phosphid. That is to say, if one employs a natural phosphate containing, when reduced in a state of chemical combination, say 35% of phosphorus to 65% of iron, instead of making a ferro-phosphorus of these proportions of iron and phosphorus, it is found that only about 22% of phosphorus has been retained in the product. In other words, some of the combined phosphorus is liberated and passes off with the exit gases.

Therefore, according to this invention, the said partial pressures of the reaction products are increased above the normal, or beyond those attainable in a blast furnace, and in carrying out this said invention, I proceed as follows:—

I provide a suitable furnace of the crucible or other closed type, and I charge the same with an artificial iron phosphate or a natural iron phosphate. I mix a suitable quantity of carbon with said raw material and preferably crush the mixture before placing it in the crucible or furnace. The crucible, or other furnace is then closed to the atmosphere, and heated by any suitable means, such for example, as an oil blast, a gas blast, a current of electricity, etc., and the charge is brought to the reacting temperature which is between say 1000° C. and 1500° C. A suitable pressure gage is provided which indicates the total pressures on the inside of the furnace, and the partial pressures of the products of the reaction are permitted to rise as much above the normal as the joints of the furnace will permit.

That is to say, the higher the partial pressure of the liberated phosphorus rises, the more phosphorus will be retained in the reduced phosphid and appear in the ferrophosphorus produced.

During the reaction which takes place, the iron and phosphorus being already chemically combined, it is only necessary for the carbon to react with the oxygen present, and therefore, by increasing the partial pressure of the liberated phosphorus above the normal, I am enabled to get phosphorus contents in the resulting iron phosphid, ranging all the way from say 25% of phosphorus up to 32% or 33% of phosphorus, according to the partial pressures that are generated in the furnace.

I prefer to operate with a total pressure in the furnace of about two to three atmospheres, and I obtain under such pressures, a phosphorous content of about 28% to 30% of phosphorus in the ferro-phosphorus produced instead of say 22%.

I find it convenient to stop at this limit of pressure, because the maintaining of the joints of the furnace at higher pressures is found too troublesome.

After the reactions have been completed, and the product produced, and after the excess of the partial pressure of the liberated phosphorus has caused a greater quantity of phosphorus to be retained in the iron, in the manner above stated, said additional phosphorus is liable to escape from said iron should the abnormal partial pressure of the phosphorus be removed while the contents of the furnace are at the reacting temperature. To prevent this, I permit the said contents to cool below the reacting temperature before opening the furnace. At the same time I do not permit said contents to cool below the temperature at which they can be conveniently removed from the furnace. The slag and other impurities which come to the top are poured or led off, whereupon the molten ferro-phosphorus itself is removed from the furnace in any suitable way. In case the ores contain a considerable proportion of impurities, the said impurities are dealt with by adding fluxing or other materials according to the nature of the said impurities.

In order that the process may be the more clearly understood, a charge may be made up in accordance with the following proportions:—

| | |
|---|---|
| Phosphatic material | 14,700 lbs. |
| Containing $Fe_2(PO_4)_2$ 12,110 lbs. | |
| Containing silica $SiO_2$ 2,590 lbs. | |
| Lime stone | 4,300 lbs. |
| Containing CaO 2,410 lbs. | |
| Coke | 6,000 lbs. |

It is obvious that those skilled in the art may vary the details of the process without departing from the spirit of the invention, and therefore, I do not wish to be limited to the above disclosure except as may be required by the claims:—

What I claim is:—

1. The process of producing ferro-phosphorus containing more than 22% of phosphorus which consists in preparing a suitable charge consisting essentially of a fluxing material carbon and iron phosphate; heating said charge in a closed furnace to a temperature sufficient to cause substantially all the oxygen of said phosphate to combine with the carbon present while maintaining the partial pressures of the reaction products above the normal; and suitably recovering the ferro-phosphorus thus produced, substantially as described.

2. The process of producing ferro-phosphorus containing more than 22% of phosphorus which consists in preparing a suitable charge consisting essentially of silica limestone carbon and iron phosphate; heating said charge in a closed furnace to a temperature sufficient to cause substantially all the oxygen of said phosphate to combine with the carbon present while maintaining the partial pressures of the reaction products above the normal; permitting said charge to cool below the reacting temperature; opening said furnace to the atmosphere; and suitably recovering the ferro-phosphorus thus produced, substantially as described.

In testimony whereof I affix my signature, in presence of a witness.

HYLEMAN ALISON WEBSTER.

Witness:
T. A. WITHERSPOON.